Aug. 28, 1962   H. T. FINCH   3,051,408
RECORD TAPE LOADING AND DRIVE MECHANISM
Filed Oct. 20, 1958   2 Sheets-Sheet 1

INVENTOR.
HORACE T. FINCH
BY
R.E. Geauque
Attorney

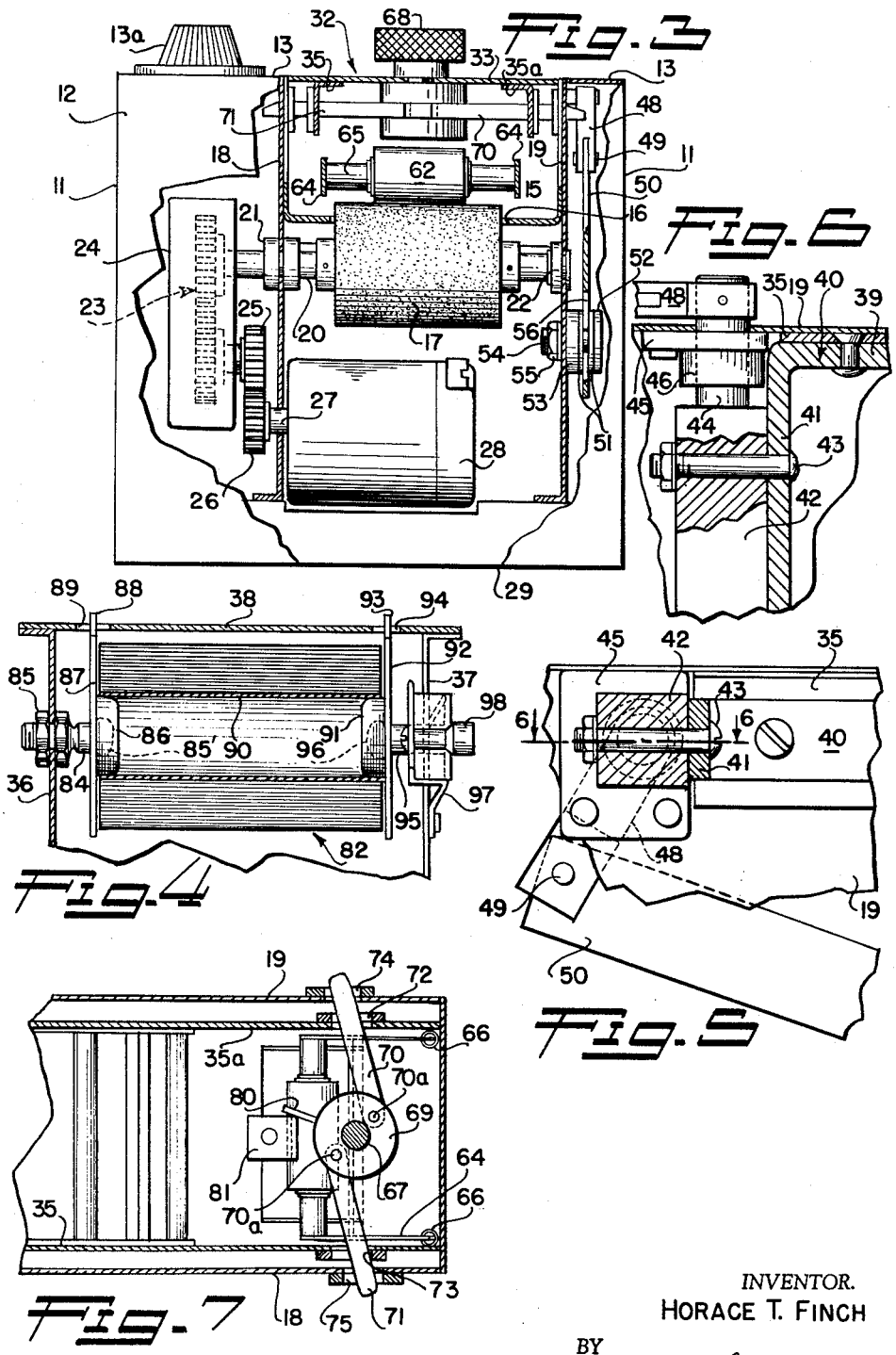

United States Patent Office 3,051,408
Patented Aug. 28, 1962

3,051,408
RECORD TAPE LOADING AND
DRIVE MECHANISM
Horace T. Finch, Arcadia, Calif., assignor to The Birtcher Corporation, Los Angeles, Calif., a corporation of California
Filed Oct. 20, 1958, Ser. No. 768,219
2 Claims. (Cl. 242—75.4)

This invention relates to a record tape loading and drive mechanism and more particularly to a mechanism wherein the record tape can be easily mounted and placed in coacting relationship with the drive mechanism.

In the present invention, the section, of the recording machine which mounts the roll of record tape is movably mountable for outward movement with respect to the remainder of the machine, for facilitating the loading of the tape. After loading, the tape is simply laid along a tape channel located between the movable section and fixed section of the recording machine and the movable section is thereafter returned to closed position and locked. Means are provided on the movable and fixed sections of the machine and coactive with the tape when closed for guiding and driving the tape through the machine. A pair of arms supporting a roll of record tape produce a friction drop opposing rotation of the roll and as the roll reduces in size, the total friction drag on the roll decreases. At the same time, the torque developed by the drive mechanism to pull the tape off of the roll reduces as the roll becomes smaller since the torque arm is also reducing. Therefore, a substantially constant drive force can be utilized to move the tape through the recording machine. Also, the tape confining arms cause the tape to extend straight outwardly from the roll as it leaves the roll and if the tape is not initially positioned along a straight path through the guides and drive rollers, it will quickly and automatically seek a straight position since any slack at one side of the tape will be taken up by the drive rollers, and the tape will move relative to the rollers into a straight path.

It is therefore an object of the present invention to provide a record tape drive mechanism for recording machines in which tape guides and drive elements are mounted on separate relatively movable sections of the machine so that the tape can be simply extended between these sections and the sections thereafter locked together to properly engage the tape with the guides and drive elements.

Another object of the invention is to provide a quick loading mechanism for a roll of record tape having arms extending along the ends of the roll and biased against the ends of the roll to produce a friction drag substantially proportional to the diameter of the roll so that the force required to move the tape from the roll will be substantially constant.

A further object of the invention is to provide guide arms extending along opposite ends of a tape roll to cause the tape to leave the roll in a direction perpendicular to the axis of the roll so that the guides and drive mechanism for the tape will automatically compensate for any deviation from a straight tape direction.

These and other objects of the invention not specifically set forth above will become readily apparent from the accompanying description and drawings, in which:

FIGURE 3 is a transverse vertical section along line 3—3 of FIGURE 2 showing the drive rollers connected with the drive motor;

FIGURE 4 is a horizontal section along line 4—4 of FIGURE 2 illustrating the roll of record tape supported by hubs having arms engaging the ends of the roll;

FIGURE 5 is a partial vertical section, similar to FIGURE 2 and enlarged to illustrate the mounting for the movable section of the recording machine;

FIGURE 6 is a horizontal section along line 6—6 of FIGURE 5; and

FIGURE 7 is a horizontal section along line 7—7 of FIGURE 2 showing the mechanism for locking the two sections together.

Figure 1:
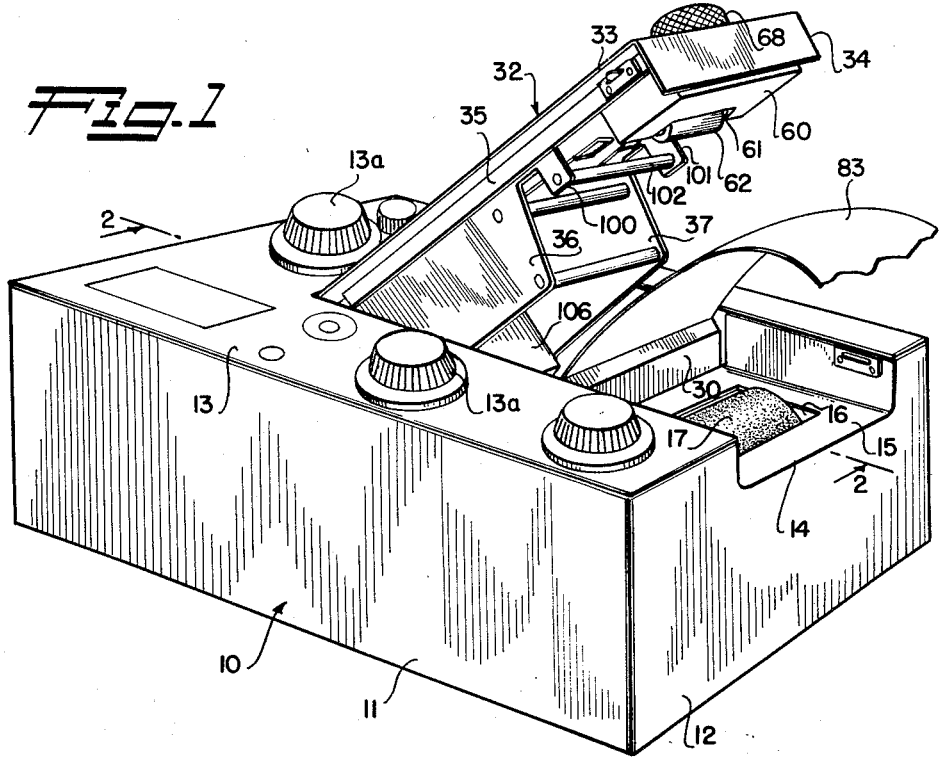
FIGURE 1 is a perspective view of a recording machine showing the manner in which the tape is extended between two relatively movable sections of the machine for loading.

Referring to FIGURE 1, recording mechanism 10 comprises a rectangular container having two side panels 11, two end panels 12, a bottom panel 11a and a partial top panel 13. A container of this type can be utilized for various types of recording mechanism, such as an electrocardiograph, and the suitable control knobs 13a can be located adjacent the top panel 13. One of the end panels 12 has a U-shaped cutout 14 from which extends a U-shaped plate 15 having an opening 16 through which projects the main drive roller 17. The sides of plate 15 are secured to stationary panels 18 and 19 located within the sides 11 and parallel thereto, and the roller 17 has a shaft 20 which is supported in panels 18 and 19 by bearings 21 and 22, respectively. The shaft 20 extends through panel 18 and connects with gearing 23 located within gear box 24, and this gearing also connects with a gear 25 in mesh with a pinion gear 26 connected to shaft 27 of the drive motor 28. The drive motor 28 is secured to a bottom flange 29 extending along the bottom panel 11a and the gear box 24 contains suitable reduction gearing for driving the roller 17 at the desired tape speed. It is understood that variable speed reduction gearing can be utilized in box 24 if more than one speed of the roller 17 is desired.

A knife edge 30 is located at the inner edge of the plate 15 and projects upwardly above the surface of plate 15. The knife edge 30 and the shaft for the roller 17 are stationary with the main section of the container 10 so that the knife edge and roller comprise fixed elements of the tape guide and drive mechanism. A section 32 of the recording machine is movable relative to the container and to the knife edge 30 and drive roller 17. Movable section 32 comprises a top plate 33 which has a downwardly extending flange 34 which cooperates with cutout 14 to form a tape discharge opening 34a. A pair of L-shaped brackets 35 and 35a extend along the under surface of top panel 33 at opposite edges thereof and serves to support side panels 36 and 37, respectively, and a back panel 38 (see FIGURES 1 and 2). Also, the legs 39 of a U-shaped bracket 40 are secured to bracket 35 and 35a so that the portion 41 of the bracket 40 extends transversely of the top panel 33. A member 42 extends along the bracket 40 and is secured thereto by bolts 43, and each end of the member 42 is formed into a circular end shaft 44. Each of the panels 18 and 19 support a plate 45 carrying a bearing 46 for one of the end shafts 44, and since the member 42 and bracket 40 comprise a portion of the top section 32, the top section can be pivoted outwardly about the end shafts 44 as illustrated in FIGURE 1.

One of the end shafts 44 has pinned thereto an arm 48, which extends downwardly and in turn, is pivotally connected by pin 49 to a second arm 50. The end of the arm 50 extends between two nylon washers 51 (see FIGURE 3) which are located between a flange 52 and a washer 53 on a bolt 54. The bolt 54 is spaced from shaft 44 and the end of the bolt extends through panel 19 and is secured thereto by nut 55. The end of arm 50 has a slot 56 which receives the bolt 54 so that the end of the arm can slide between the two washers, and the friction between the arm and the washers is adjustable by the tightening of nut 55. Thus, the frictional engagement of washers 51 with arm 50 serves to hold the movable section 32 in any desired outward position while permitting the section to be easily moved outwardly and inwardly relative to the container 10.

A cover member 60 is supported at the ends of brackets 35 and 35a and has a cut-out opening 61 to receive an idle roller 62. A shaft 63 (see FIGURE 2) extends between the sides of the cover member 60 and pivotally supports two lever arms 64. A shaft 65 extends between the two arms at one end thereof in order to rotatably support the roller 62 in position adjacent the drive roller 17. The other end of each arm 64 is connected by a spring 66 to the cover member 60 so that the roller 62 is continually biased through the opening 61. Also, a locking mechanism is located within the cover member 60 and comprises a shaft 67 extending through the cover plate 33 and having a locking knob 68. Within the cover member, the shaft carries spaced discs 69 to which are pivotally connected locking arms 70 and 71 by means of pins 70a. These locking arms extend through openings 72 and 73 in the brackets 35 and 35a when the knob 68 is rotated clockwise to the unlocked position. However, when the knob is rotated counter clockwise to the locking position, as illustrated in FIGURE 7, the arms 70 and 71 also extend through openings 74 and 75 in panels 18 and 19 in order to firmly secure the movable section 32 to the other section of the instrument. The inner disc 69 carries a stop arm 80 which engages a bracket 81 secured to top panel 33 in order to limit the counter clockwise rotation of the knob 68.

A roll 82 of record tape is mounted on the movable section 32 between panels 36 and 37. The panel 36 extends downwardly and has an opening for receiving the end of shaft 84, and a nut 85 serves to lock the shaft to the panel. One end of the shaft 84 comprises a ball 85' which is located within hub 86 to form a ball and socket connection therewith, and the hub 86 supports a flat, substantially rectangular arm 87 which extends along one end of the roll 82. A reduced end 88 of arm 87 projects through a slot 89 in the back panel 38 to prevent rotation of the arm 87 with roll 82 while permitting angular movement of the arm relative to shaft 84. The hub 86 projects into one end of hollow sleeve 90 of the roll 82 in order to rotatably support the sleeve. The other end of the sleeve 90 is similarly supported by a hub 91 having a substantially rectangular arm 92 extending along the end of the roll and the arm 92 has a reduced end 93 located within an opening 94 of the back panel 38 to prevent rotation of the arm. The hub 91 is supported by a shaft 95 having a ball 96 received within the hub to form a ball and socket connection, and the shaft 95 is supported by a spring arm 97 connected at one end to side panel 37 and extending downwardly into the cut-out opening in the panel 37. Because of the shape of the spring arm 97, the hub 91 is normally spaced from hub 86 by a distance less than the length of sleeve 90 so that it is necessary to spring the arm 97 outward to permit the mounting of the sleeve 90 on the hubs. release of the spring arm 97 after mounting of the roll 82 will cause the hubs 86 and 91 to be biased into the ends of sleeve 90 and will cause the arms 87 and 92 to frictionally engage the ends of the roll 82. With the movable section 32 in its full outward position, the mounting hubs are easily accessible for mounting a roll of tape and the spring arm is easily accessible for movement and release during the loading operation.

Figure 2:
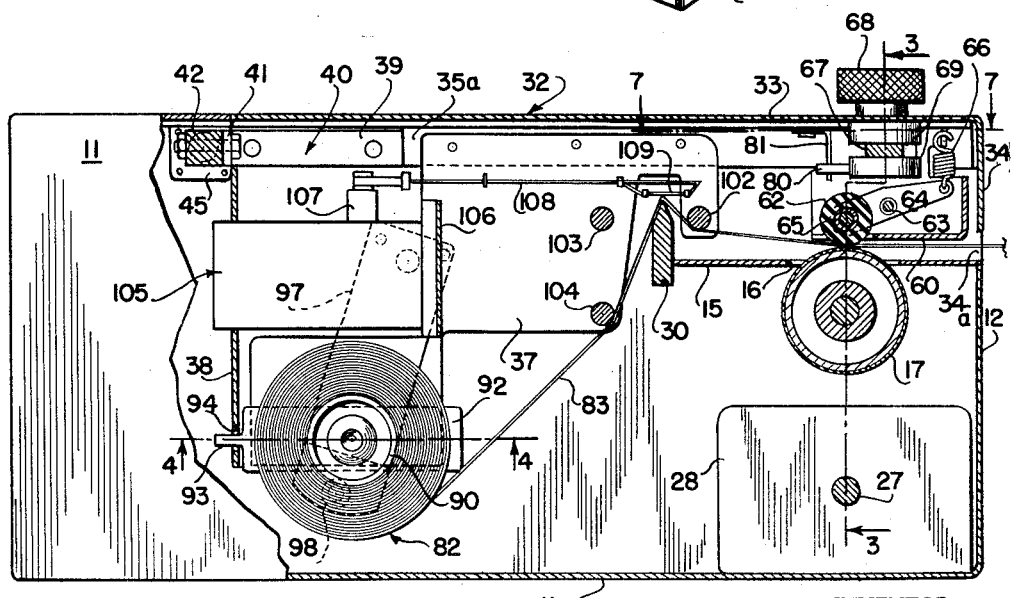
FIGURE 2 is a vertical section along line 2—2 of FIGURE 1 showing the movable section in closed position and illustrating the path of the tape relative to the guides and drive elements of the two sections.

As illustrated in FIGURE 2, the record tape 83 is unwound from the bottom of the roll 82. The panels 36 and 37 have projections 100 and 101 between which extends a rod 102, and rods 103 and 104 are located between the edges of the main portions of the panels 36 and 37. As illustrated in FIGURE 2, the rods 102 and 104 serve as guides for the record strip 83 and the rod 103 serves as additional support for the panels 36 and 37. A suitable motion generating mechanism 105 is supported by end panel 38 and by a partition panel 106, and has an output arm 107 connected to a stylus arm 108. The end of the stylus arm 108 supports a stylus marker 109 which is located opposite the knife edge 30 when the movable section 32 is in closed position. It is understood that the motion generator mechanism 105 can be electrical, mechanical, or hydraulic and the output movement thereof can represent any desired quantity to be recorded.

When it is desired to place the recording mechanism in operation, the movable section 32 is first moved outwardly so that the record roll 82 can be easily loaded between the arms 87 and 92 in the manner previously described. Thereafter, the end of the record tape is simply pulled over the knife edge 30 and over the bottom panel 15 so that it extends beyond the end panel 12 of the machine. The movable section 32 is then moved inwardly and locked in position by rotation of hub 68. In the locked position, the idle roller 62 forces the record strip against the drive roller 17 since the idle roller is moved slightly against the force of springs 66 in order to permit locking of the movable section. Also, with the movable section in locked position, the tape extends underneath rod 104, over the knife edge 30 and underneath the rod 102 and the marking stylus 109 is located above the record tape at the knife edge so that the stylus can move transversely of the knife edge and provide a continuous record on the tape as it is driven forwardly by the roller 17.

During initial withdrawal of the tape, the arms 87 and 92 bear against a large end area of the roll to provide a frictional force opposing unwinding of the tape. The large diameter of the roll during initial withdrawal also provides a large torque arm to overcome the frictional force produced by the arms 87 and 92. As the diameter of the roll decreases, the torque arm and the end area of the roll engaged by the plates 87 and 92 both decrease in a manner such that the drive roller 17 can develop substantially a constant driving force on the tape during unwinding of the roll. Also, the arms 87 and 92 will cause the tape 83 to leave the roll 82 in a direction substantially perpendicular to the axis of the roll. If the tape is not originally placed between the movable and fixed sections in a straight direction from the roll, a slack will result at one side or the other of the tape. The drive roll 17 and idle roll 62 will automatically take up the slack at one edge of the tape, and in so doing, the tape will move laterally between the rolls until it assumes a straight position with respect to the roll. It is understood that after the movable section 32 is closed and locked, any suitable circuit control can be utilized to start the motor 28 to start the drive roller 17, and suitable control knobs 13a can be moved to actuate the motion generating mechanism 105. Because of the drag placed on the roll by the arms 87 and 92, the tape will extend tightly between the roll 82 and the drive roller 17 and the arms 104 and 102 will cause the tape to bend sharply around the knife edge 30 so that a sharp line will be drawn on the tape by the marking stylus 109.

The present invention therefore provides a loading and drive mechanism for a record tape which provides for easy and quick mounting of the tape roll by simply moving a portion of the loading mechanism. In order to properly locate the tape past the recording stylus and the drive roller, it is only necessary to extend the tape between the fixed and movable sections of the recording machine. It is apparent that the guide rods and knife edge can be located in various positions depending upon the construction of the recording mechanism, and that the movable section can be modified for incorporation in various types of recording mechanisms. Various other modifications are contemplated by those skilled in the art without departing from the spirit and scope of the invention as hereinafter defined by the appended claims.

What is claimed is:

1. A mechanism for mounting a roll of record tape wound on a hollow sleeve comprising: first and second aligned hubs insertable into the hollow ends of said sleeve; first and second supports each rotatably mounting a respective one of said hubs, said first support being stationary and the second support being movable, spring means for resiliently biasing said second support toward said first support whereby said hubs are normally spaced apart a distance less than the length of said sleeve and said hubs are insertable into such hollow ends of said sleeve by forcibly opposing said spring means; a first arm supported by said first hub and movable independently of the support which rotatably mounts the first hub, said first arm extending from said first hub across one end of said sleeve and tape supported thereby; a second arm supported by said second hub and movable independently of the support which rotatably mounts the second hub, said second arm extending from said second hub across the other end of said sleeve and tape supported thereby; fixed means engaging said arms for preventing rotation of said arms with said sleeve during unwinding of said tape while permitting angular and longitudinal movement of said arms with respect to the axis of said sleeve, said arms being held in uniform frictional engagement with the entire ends of said roll of tape by said spring means and serving to guide the tape from said roll in a straight direction while maintaining an axial drag force on said roll substantially proportional to the radial thickness of said roll.

2. A mechanism as defined in claim 1 wherein said fixed means comprises a stationary panel containing a pair of spaced openings, each opening receiving the end of one of said arms, each opening being narrow in a plane transverse to the axis of the sleeve to prevent rotation of its associated arm and being extended in a plane passing through the axis of the sleeve to permit angular movement of said arm with respect to the axis of said sleeve in a plane including said axis and limited longitudinal movement of said arm relative to said axis in a plane substantially normal thereto.

References Cited in the file of this patent

UNITED STATES PATENTS

| | | |
|---|---|---|
| 935,078 | Wheeler | Sept. 28, 1909 |
| 1,676,797 | Nyman | July 10, 1928 |
| 2,001,780 | Fry | May 21, 1935 |
| 2,066,405 | Knowlton | Jan. 5, 1937 |
| 2,524,564 | Gorham | Oct. 3, 1950 |
| 2,575,959 | Hogan | Nov. 20, 1951 |
| 2,590,554 | Lukacs | Mar. 25, 1952 |
| 2,646,337 | Gorham | July 21, 1953 |

FOREIGN PATENTS

| | | |
|---|---|---|
| 141,904 | Australia | July 2, 1951 |
| 596,798 | Great Britain | Jan. 12, 1948 |